US008223822B2

United States Patent
Kim

(10) Patent No.: US 8,223,822 B2
(45) Date of Patent: Jul. 17, 2012

(54) SIGNAL TRANSCEIVER FOR DIFFERENTIAL DATA COMMUNICATION OF TERNARY DATA AND METHOD THEREFOR

(75) Inventor: Chan-kyung Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1189 days.

(21) Appl. No.: 12/071,069

(22) Filed: Feb. 15, 2008

(65) Prior Publication Data

US 2008/0219333 A1 Sep. 11, 2008

(30) Foreign Application Priority Data

Feb. 15, 2007 (KR) ........................ 10-2007-0016121

(51) Int. Cl.
*H04B 1/38* (2006.01)
(52) U.S. Cl. ...................................................... 375/219
(58) Field of Classification Search ................... 375/219, 375/220, 244, 286; 326/30, 86, 90; 327/202
See application file for complete search history.

(56) References Cited

U.S. PATENT DOCUMENTS

| | | | | |
|---|---|---|---|---|
| 5,166,956 A * | 11/1992 | Baltus et al. | ............... | 375/286 |
| 6,452,420 B1 * | 9/2002 | Wong | ............... | 326/86 |
| 7,027,522 B2 * | 4/2006 | Pickering et al. | ............... | 375/286 |
| 2002/0063605 A1 * | 5/2002 | Boerstler | ............... | 331/57 |
| 2004/0150449 A1 * | 8/2004 | Durham et al. | ............... | 327/202 |

FOREIGN PATENT DOCUMENTS

| KR | 1020040087351 | 10/2004 |
|---|---|---|
| KR | 10-2007-0066637 | 6/2007 |

OTHER PUBLICATIONS

Office Action dated Apr. 16, 2008 for corresponding Korean Application No. 10-2007-0016121.

* cited by examiner

*Primary Examiner* — Jaison Joseph
(74) *Attorney, Agent, or Firm* — Harness, Dickey & Pierce, P.L.C.

(57) ABSTRACT

A signal transceiver may include three transmission lines, a signal transmission unit, and/or a signal reception unit. The signal transmission unit may be configured encode first through third transmission data to generate first through third data and transmit the first through third data through the three transmission lines. The signal transmission unit may be configured to generate each of the first through third data at one of four or more voltage level. The signal reception unit may be configured to receive the first through third data and monitor voltage differences between the first through third data to restore the first through third data into first through third reception data.

21 Claims, 13 Drawing Sheets

"FIRST" STATUS : Vc > Vb > Va

SIGNAL TRANSCEIVER FOR DIFFERENTIAL DATA COMMUNICATION OF TERNARY DATA AND METHOD THEREFOR

PRIORITY STATEMENT

This application claims the benefit of priority to Korean Patent Application No. 10-2007-0016121, filed on Feb. 15, 2007, in the Korean Intellectual Property Office, the entire contents of which are incorporated herein in their entirety by reference.

BACKGROUND

1. Field

Example embodiments relate to a method and apparatus for data communication, and for example, to a signal transceiver for differential data communication of ternary data using three transmission lines and/or a method therefor.

2. Description of Related Art

Binary data communication is usually performed using a single-ended interface in which a signal of a transmission line corresponds to a bit of binary data. A binary single-ended interface is effectively used in a noiseless environment. However, in an environment where a width of a voltage swing is decreased in order to obtain higher-speed data transmission, the binary single-ended interface may not accurately receive data due to noise. Therefore, a differential-ended interface, in which a differential signal is transmitted by using two transmission lines, has been developed. The differential-ended interface transmits two statuses, i.e., 1-bit data using two transmission lines.

The differential-ended interface has ½ the data transmission efficiency, i.e., the differential-ended interface has a data transmission efficiency of a bit number of data divided by a number of transmission lines. In order to implement higher data transmission efficiency, a method and apparatus for transmitting a differential signal using an electric current loop have been developed.

FIG. 1 is a diagram illustrating a conventional differential signal transceiver.

Referring to FIG. 1, the differential signal transceiver uses three transmission lines 330a, 330b, and 330c to transmit data from a signal transmission unit 310 to a signal reception unit 320. The signal reception unit 320 receives a signal generated from the signal transmission unit 310 through a plurality of ports Pa, Pb, and Pc. First through third matching means 340a, 340b, and 340c are respectively connected between the ports Pa, Pb, and Pc.

In the signal reception unit 320, voltage magnitudes of the ports Pa, Pb, and Pc may vary in accordance with a direction of an electric current of the first through third matching means 340a, 340b, and 340c. The signal reception unit 320 recognizes six statuses of data in accordance with the orders of the voltage magnitudes of the ports Pa, Pb, and Pc.

FIG. 2 is a detailed diagram of the signal reception unit 320 illustrated in FIG. 1.

If the direction of the electric current is Pc→Pb→Pa, the voltage magnitudes of the ports Pa, Pb, and Pc are Vc>Vb>Va, which is referred to as a first status. If the direction of the electric current is Pb→Pa→Pc, the voltage magnitudes of the ports Pa, Pb, and Pc are Vb>Va>Vc, which is referred to as a second status. If the direction of the electric current is Pb→Pc→Pa, the voltage magnitudes of the ports Pa, Pb, and Pc are Vb>Vc>Va, which is referred to as a third status. If the direction of the electric current is Pa→Pc→Pb, the voltage magnitudes of the ports Pa, Pb and Pc are Va>Vc>Vb, which is referred to as a fourth status. If the direction of the electric current is Pc→Pa→Pb, the voltage magnitudes of the ports Pa, Pb and Pc are Vc>Va>Vb, which is referred to as a fifth status. If the direction of the electric current is Pa→Pb→Pc, the voltage magnitudes of the ports Pa, Pb and Pc are Va>Vb>Vc, which is referred to as a sixth status.

The six statuses, i.e., data having six patterns, are 2.58-bit data and the data transmission efficiency is improved to 2.58/3. However, the above described conventional differential signal transceiver cannot completely transmit 3-bit data having eight patterns.

SUMMARY

Example embodiments provide a signal transceiver for differential data communication of ternary data using three transmission lines.

Example embodiments provide a method for data communication using the signal transceiver.

According to an example embodiment, a signal transceiver may include three transmission lines, a signal transmission unit, and/or a signal reception unit. The signal transmission unit may be configured encode first through third transmission data to generate first through third data and transmit the first through third data through the three transmission lines. The signal transmission unit may be configured to generate each of the first through third data at one of four or more voltage levels. The signal reception unit may be configured to receive the first through third data and monitor voltage differences between the first through third data, e.g., monitor middle voltages between the first through third data, to restore the first through third data into first through third reception data.

According to a n example embodiment, the voltage levels of the first through third data may be based on electric current paths respectively formed on the three transmission lines.

According to an example embodiment the signal transmission unit may include and encoder and/or an output driver. The encoder may be configured to encode the first through third transmission data to generate first through third up signals and first through third down signals. The output driver may be configured to determine the voltage levels of first through third data based on a number of switches turned on in response to the first through third up signals and the first through third down signals. The three transmission lines may include first through third transmission lines configured to respectively transmit the first through third data. The signal reception unit may include a differential amplification unit, a middle level detection unit, a flip-flop unit, and/or a decoder. The differential amplification unit may be configured to sense-amplify the voltage differences between two data from among the first through third data transferred through the first through third transmission lines. The middle level detection unit may be configured to receive a plurality of output signals of the differential amplification unit and generate a plurality of level signals. The flip-flop unit may be configured to sense each of the output signals of the differential amplification unit and each of the level signals of the middle level detection unit and generate a plurality of sensing signals. The decoder may be configured to decode a plurality of output signals of the flip-flop unit to output the first through third reception data.

According to an example embodiment, the encoder may include a buffer unit and/or an encoding unit. The buffer unit may be configured to which receive the first through third transmission data and generate first through sixth encoding signals. The encoding unit may be configured to receive the first through sixth encoding signals and generate the first through third up signals and the first through third down signals.

According to an example embodiment, the output driver may include a bias unit and/or a switch unit. The bias unit may be configured to compare a reference voltage and a common voltage and generate first and second bias signals. The switch unit may include the switches, and/or the switches may be configured to be enabled in response to the first and second bias signals and turned on in response to the first through third up signals and the first through third down signals.

According to an example embodiment, the differential amplification unit may include a first differential amplifier, a second differential amplifier, and/or a third differential amplifier. The first differential amplifier may be configured to sense-amplify the voltage difference between the first and second data. The second differential amplifier may be configured to sense-amplify the voltage difference between the second and third data. The third differential amplifier may be configured to sense-amplify the voltage difference between the first and third data.

According to an example embodiment, the middle level detection unit may include a first middle level detector and/or a second middle level detector. The first middle level detector may be configured to compare a level of an output signal of the first differential amplifier with levels of output signals of the second and third differential amplifiers and generate a first level signal. The second middle level detector may be configured to compare the level of the output signal of the third differential amplifier with the levels of the output signals of the first and second differential amplifiers and generate a second level signal.

According to an example embodiment, the flip-flop unit may include a first flip-flop, a second flip-flop, a third flip-flop, a fourth flip-flop, and/or a fifth-flip flop. The first flip-flop may be configured to sense the output signal of the first differential amplifier and generate first and second sensing signals. The second flip-flop may be configured to sense the output signal of the second differential amplifier and generate third and fourth sensing signals. The third flip-flop may be configured to sense the output signal of the third differential amplifier and generate fifth and sixth sensing signals. The fourth flip-flop may be configured to sense the first level signal of the first middle level detector and generate seventh and eighth sensing signals. The fifth flip-flop may be configured to sense the second level signal of the second middle level detector and generate ninth and tenth sensing signals.

According to an example embodiment, the decoder may include a first reception data generation unit, a second reception data generation unit, and/or a third reception data generation unit. The first reception data generation unit may be configured to output at least one of the first sensing signal and the second sensing signal as the first reception data in response to the seventh and ninth sensing signals. The second reception data generation unit may be configured to output the third sensing signal as the second reception data. The third reception data generation unit may be configured to output at least one of the fifth sensing signal and the sixth sensing signal as the third reception data in response to the seventh sensing signal.

According to an example embodiment, a method for data communication may include encoding first through third transmission data. First through third data may be generated based on a number of switches turned on in response to the encoded first through third transmission data, each the first through third data generated at one of four or more voltage levels. The first through third data may be respectively transmitted through first through third transmission lines. The first through third data may be received. Voltage differences between two data from among the first through third data may be sense-amplified to restore the first through third data into first through third reception data.

According to an example embodiment, the voltage levels of the first through third data may be based on electric current paths respectively formed through the turned-on switches on the first through third transmission lines.

According to an example embodiment, the sense-amplifying the voltage differences between the two data from among the first through third data may generate a plurality of differential output signals. The method for data communication may further include comparing voltage levels of the differential output signals and generating a plurality of middle level signals. Each of the differential output signals and each of the middle level signals may be sensed to generate a plurality of sensing signal. The sensing signals may be decoded to output the first through third reception data.

According to an example embodiment, the encoding the first through third transmission data may include generating a plurality of up signals and a plurality of down signals. The generating the first through third data may include respectively forming electric current paths on the first through third transmission lines through a plurality of switches turned on in response to the up and down signals. The method for data communication may further include sensing voltage differences between the first through third data and monitoring voltage differences between the voltage levels of the first through third data to generate a plurality of sensing signals. The sensing signals may be decoded to restore the first through third data into the first through third reception data.

Accordingly an example embodiment, random data communication of 3-bit data having eight patterns may be enabled in a differential mode using three transmission lines.

BRIEF DESCRIPTION OF THE DRAWINGS

The above and/or other aspects and advantages will become more apparent and more readily appreciated from the following detailed description of example embodiments taken in conjunction with the accompanying drawings of which.

DETAILED DESCRIPTION OF EXAMPLE EMBODIMENTS

Figure 1:
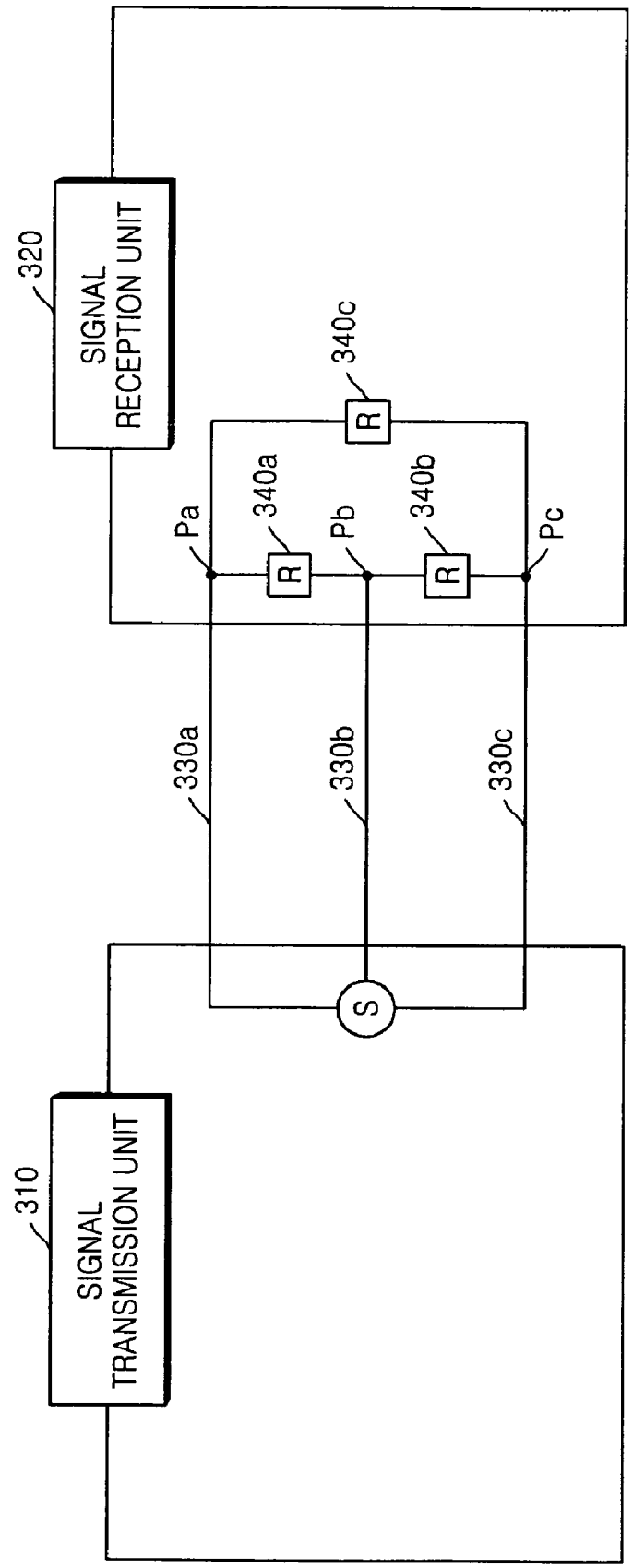
FIG. 1 is a diagram illustrating a conventional differential signal transceiver.
Figure 2:
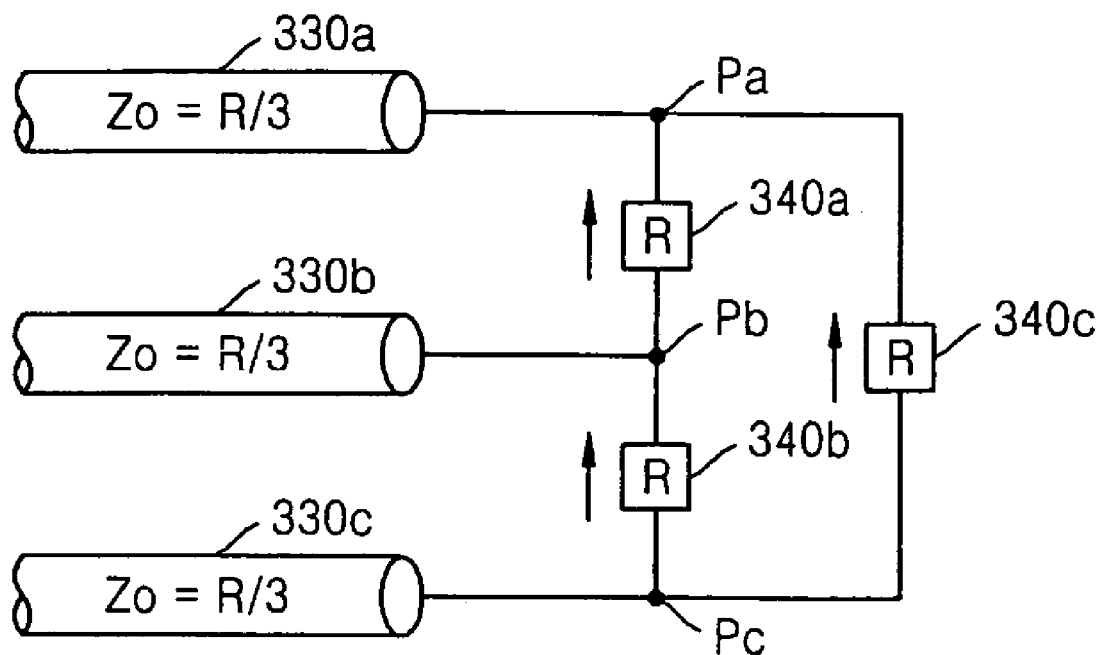
FIG. 2 is a detailed diagram of a signal reception unit illustrated in FIG. 1.

Example embodiments will now be described more fully hereinafter with reference to the accompanying drawings. Embodiments may, however, be in many different forms and should not be construed as being limited to the example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when a component is referred to as being "on," "connected to" or "coupled to" another component, it can be directly on, connected to or coupled to the other component or intervening components may be present. In contrast, when a component is referred to as being "directly on," "directly connected to" or "directly coupled to" another component, there are no intervening components present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one component or feature's relationship to another component(s) or feature(s) as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

Figure 3:
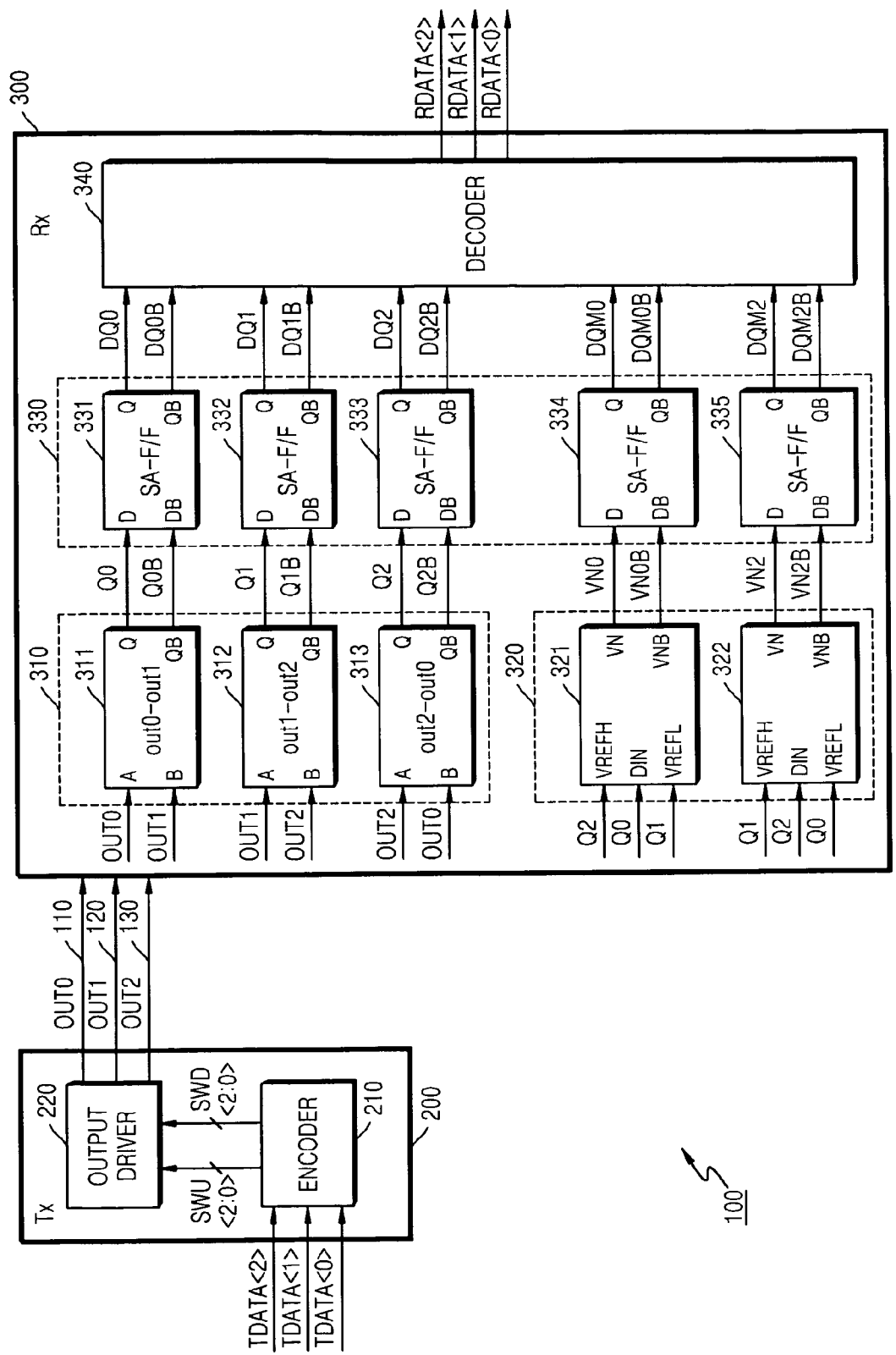
FIG. 3 is a block diagram of a signal transceiver according to an example embodiment.

FIG. 3 is a block diagram of a signal transceiver 100 according to an example embodiment.

Referring to FIG. 3, the signal transceiver 100 may include a signal transmission unit 200, a signal reception unit 300, and/or three transmission lines 110, 120, and 130 connected between the signal transmission unit 200 and the signal reception unit 300. The signal transceiver 100 may encode first through third transmission data TDATA<0> through TDATA<2>, transmit the first through third transmission data TDATA<0> through TDATA<2> through the three transmission lines 110, 120 and 130, and/or decode the first through third transmission data TDATA<0> through TDATA<2> into first through third reception data RDATA<0> through RDATA <2>.

The signal transmission unit 200 may include an encoder 210 and an output driver 220. The encoder 210 may encode the first through third transmission data TDATA<0> through TDATA<2> and generate a plurality of up signals SWU0 through SWU2 and/or a plurality of down signals SWD0 through SWD2. The output driver 220 may output first through third data OUT0 through OUT2. The first through third data OUT0 through OUT2 may have a plurality of voltage levels according to the number of switches turned on in response to the up signals SWU0 through SWU2 and the down signals SWD0 through SWD2.

Figure 4:
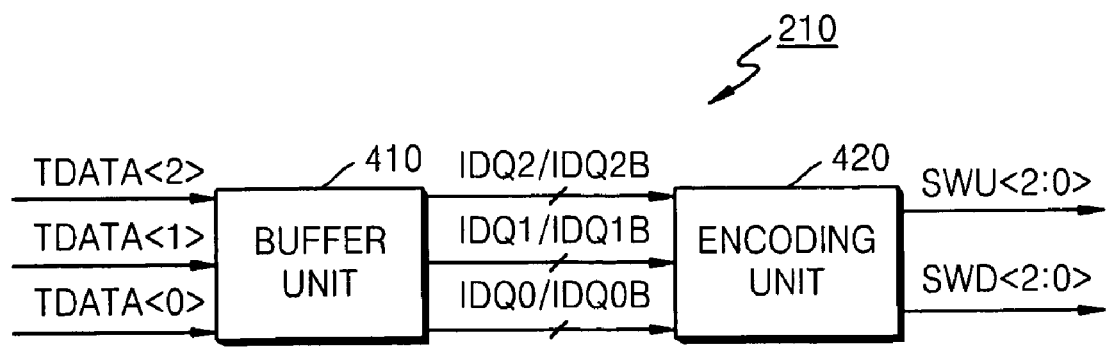
FIG. 4 is a block diagram of an encoder illustrated in FIG. 3, according to an example embodiment.

FIG. 4 is a block diagram of the encoder 210 illustrated in FIG. 3, according to an example embodiment.

Referring to FIG. 4, the encoder 210 may include a buffer unit 410 and/or an encoding unit 420. The buffer unit 410 may receive the first transmission data TDATA<0> and output first and second encoding signals IDQ0 and IDQ0B, receive the second transmission data TDATA<1> and output third and fourth encoding signals IDQ1 and IDQ1B, and/or receive the third transmission data TDATA<2> and output fifth and sixth encoding signals IDQ2 and IDQ2B. The encoding unit 420 may receive the first through sixth encoding signals IDQ0, IDQ1, IDQ2, IDQ0B, IDQ1B, and IDQ2B and generate the up signals SWU0 through SWU2 and the down signals SWD0 through SWD2.

Figure 5:
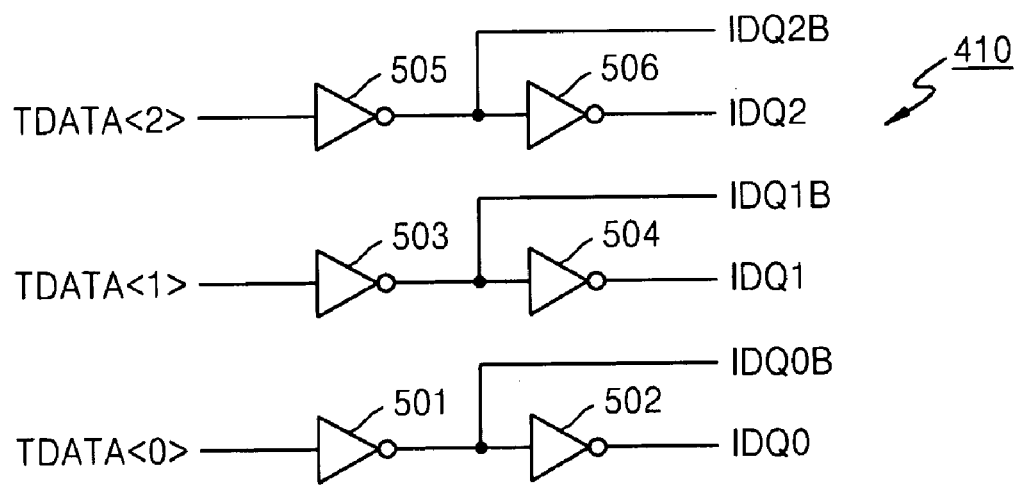
FIG. 5 is a circuit diagram of a buffer unit illustrated in FIG. 4, according to an example embodiment.

FIG. 5 is a circuit diagram of the buffer unit 410 illustrated in FIG. 4, according to an example embodiment.

Referring to FIG. 5, the buffer unit 410 may include first and second inverters 501 and 502, which are connected in series and receive the first transmission data TDATA<0>, third and fourth inverters 503 and 504, which are connected in series and receive the second transmission data TDATA<1>, and/or fifth and sixth inverters 505 and 506, which are connected in series and receive the third transmission data TDATA<2>. The output of the first inverter 501 may be the second encoding signal IDQ0B, the output of the second inverter 502 may be the first encoding signal IDQ0, the output of the third inverter 503 may be the fourth encoding signal IDQ1B, the output of the fourth inverter 504 may be the third encoding signal IDQ1, the output of the fifth inverter 505 may be the sixth encoding signal IDQ2B, and/or the output of the sixth inverter 506 may be the fifth encoding signal IDQ2.

FIGS. 6A through 6F are circuit diagrams of the encoding unit 420 illustrated in FIG. 4, according to example embodiments.

Figure 6A:
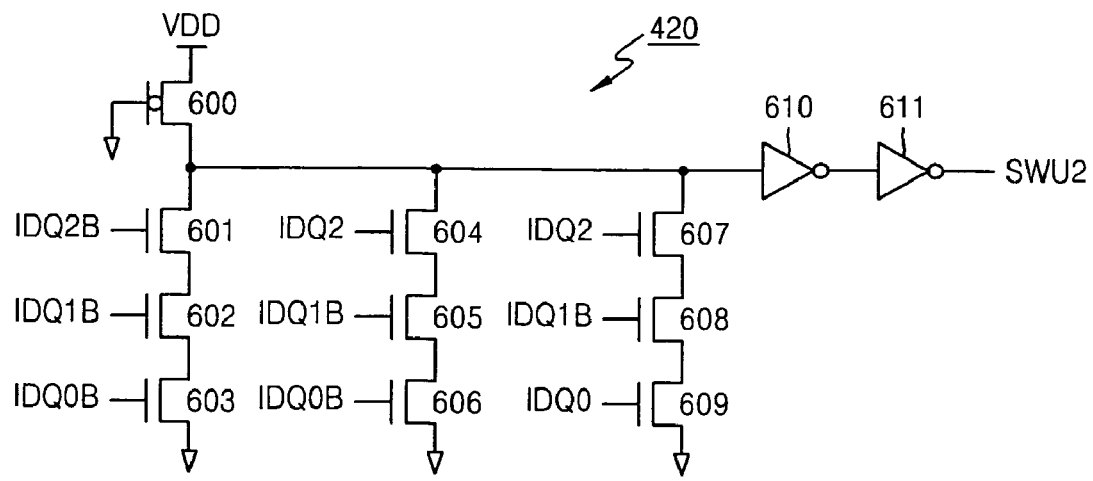
FIGS. 6A through 6F are circuit diagrams of an encoding unit illustrated in FIG. 4, according to example embodiments.

Referring to FIG. 6A, the encoding unit 420 may include a p-channel metal-oxide-semiconductor (PMOS) transistor 600. A source of the PMOS transistor 600 may be connected to a source voltage VDD and/or a gate of the PMOS transistor 600 may be connected to a ground voltage VSS. A plurality of n-channel metal-oxide-semiconductor (NMOS) transistors 601 through 603 connected in series, a plurality of NMOS transistors 604 through 606 connected in series, and/or a plurality of NMOS transistors 607 through 609 connected in series may be included between a drain of the PMOS transistor 600 and the ground voltage VSS. The drain of the PMOS transistor 600 may be connected to a plurality of inverters 610 and 611, which are connected in series, and/or the output of the inverter 611 may be generated as the third up signal SWU2. Gates of the NMOS transistors 601 through 603 may receive the sixth encoding signal IDQ2B, the fourth encoding signal IDQ1B, and the second encoding signal IDQ0B, respectively. Gates of the NMOS transistors 604 through 606 may receive the fifth encoding signal IDQ2, the fourth encoding signal IDQ1B, and the second encoding signal IDQ0B, respectively. Gates of the NMOS transistors 607 through 609 may receive the fifth encoding signal IDQ2, the fourth encoding signal IDQ1B, and the first encoding signal IDQ0, respectively. The NMOS transistors 601 through 603 may activate the third up signal SWU2 to a logic low if the first through third transmission data TDATA<0> through TDATA<2> are 000, the NMOS transistors 604 through 606 may activate the third up signal SWU2 to a logic low if the first through third transmission data TDATA<0> through TDATA<2> are 100, and/or the NMOS transistors 607 through 609 may activate the third up signal SWU2 to a logic low if the first through third transmission data TDATA<0> through TDATA<2> are 101. The third up signal SWU2 may be activated to a logic high for the remainder of the combinations of the first through third transmission data TDATA<0> through TDATA<2>.

Figure 6B:
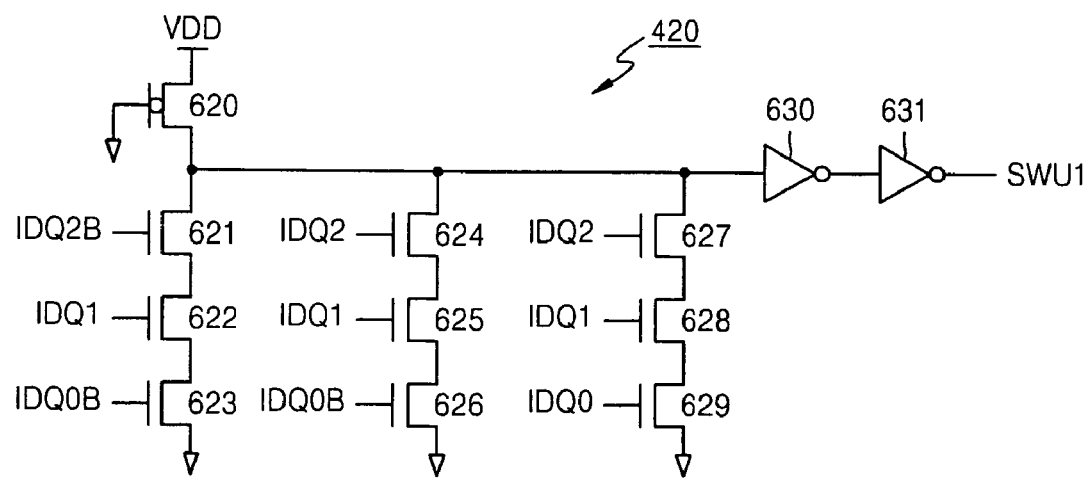

Referring to FIG. 6B, the encoding unit 420 may include a PMOS transistor 620. A source of the PMOS transistor 620 may be connected to the source voltage VDD and/or a gate of the PMOS transistor 620 may be connected to the ground voltage VSS. A plurality of NMOS transistors 621 through 623 connected in series, a plurality of NMOS transistors 624 through 626 connected in series, and a plurality of NMOS transistors 627 through 629 connected in series may be included between a drain of the PMOS transistor 620 and the ground voltage VSS. The drain of the PMOS transistor 620 may be connected to a plurality of inverters 630 and 631, which are connected in series, and/or the output of the inverter 631 may be generated as the second up signal SWU1. Gates of the NMOS transistors 621 through 623 may receive the sixth encoding signal IDQ2B, the third encoding signal IDQ1, and the second encoding signal IDQ0B, respectively. Gates of the NMOS transistors 624 through 626 may receive the fifth encoding signal IDQ2, the third encoding signal IDQ1, and the second encoding signal IDQ0B, respectively. Gates of the NMOS transistors 627 through 629 may receive the fifth encoding signal IDQ2, the third encoding signal IDQ1, and the first encoding signal IDQ0, respectively. The NMOS transistors 621 through 623 may activate the second up signal SWU1 to a logic low if the first through third transmission data TDATA<0> through TDATA<2> are 010, the NMOS transistors 624 through 626 may activate the second up signal SWU1 to a logic low if the first through third transmission data TDATA<0> through TDATA<2> are 110, and/or the NMOS transistors 627 through 629 may activate the second up signal SWU1 to a logic low if the first through third transmission data TDATA<0> through TDATA<2> are 111. The second up signal SWU1 may be activated to a logic high for the remainder of the combinations of the first through third transmission data TDATA<0> through TDATA<2>.

Figure 6C:
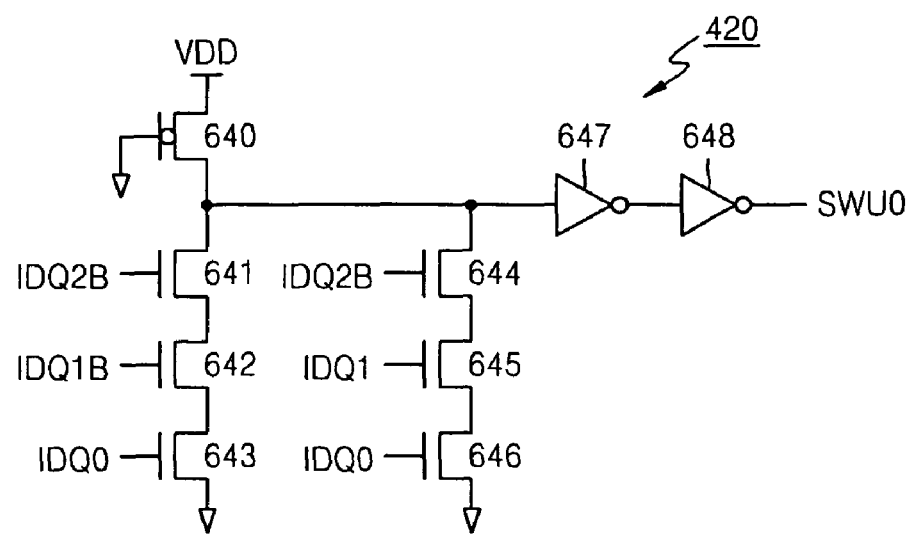

Referring to FIG. 6C, the encoding unit 420 may include a PMOS transistor 640. A source of the PMOS transistor 640 may be connected to the source voltage VDD, and/or a gate of the PMOS transistor 640 may be connected to the ground voltage VSS. A plurality of NMOS transistors 641 through 643 connected in series, and/or a plurality of NMOS transistors 644 through 646 connected in series may be included between a drain of the PMOS transistor 640 and the ground voltage VSS. The drain of the PMOS transistor 640 may be connected to a plurality of inverters 647 and 648, which are connected in series, and/or the output of the inverter 648 may be generated as the first up signal SWU0. Gates of the NMOS transistors 641 through 643 may receive the sixth encoding signal IDQ2B, the fourth encoding signal IDQ1B, and the first encoding signal IDQ0, respectively. Gates of the NMOS transistors 644 through 646 may receive the sixth encoding signal IDQ2B, the third encoding signal IDQ1, and the first encoding signal IDQ0, respectively. The NMOS transistors 641 through 643 may activate the first up signal SWU0 to a logic low if the first through third transmission data TDATA<0> through TDATA<2> are 001, and/or the NMOS transistors 644 through 646 may activate the first up signal SWU0 to a logic low if the first through third transmission data TDATA<0> through TDATA<2> are 011. The first up signal SWU0 may be activated to a logic high for the remainder of the combinations of the first through third transmission data TDATA<0> through TDATA<2>.

Figure 6D:
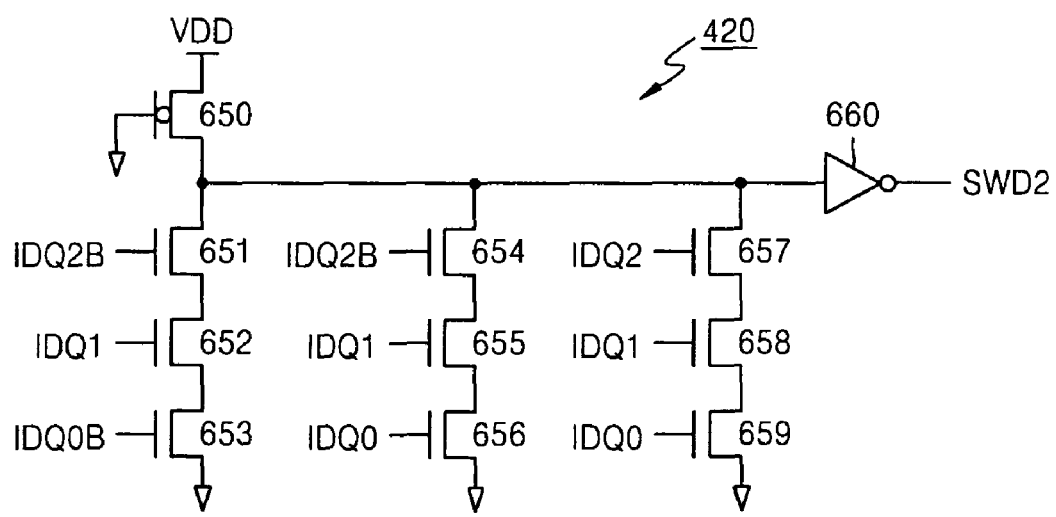

Referring to FIG. 6D, the encoding unit 420 may include a PMOS transistor 650. A source of the PMOS transistor 650 may be connected to the source voltage VDD, and/or a gate of the PMOS transistor may be connected to the ground voltage VSS. A plurality of NMOS transistors 651 through 653 connected in series, a plurality of NMOS transistors 654 through 656 connected in series, and/or a plurality of NMOS transistors 657 through 659 connected in series may be included between a drain of the PMOS transistor 650 and the ground voltage VSS. The drain of the PMOS transistor 650 may be connected to an inverter 660 and/or the output of the inverter 660 may be generated as the third down signal SWD2. Gates of the NMOS transistors 651 through 653 may receive the sixth encoding signal IDQ2B, the second encoding signal IDQ1, and the second encoding signal IDQ0B, respectively. Gates of the NMOS transistors 654 through 656 may receive the sixth encoding signal IDQ2B, the third encoding signal IDQ1, and the first encoding signal IDQ0, respectively. Gates of the NMOS transistors 657 through 659 may receive the fifth encoding signal IDQ2, the third encoding signal IDQ1, and the first encoding signal IDQ0, respectively. The NMOS transistors 651 through 653 may activate the third down signal SWD2 to a logic high if the first through third transmission data TDATA<0> through TDATA<2> are 010, the NMOS transistors 654 through 656 may activate the third down signal SWD2 to a logic high if the first through third transmission data TDATA<0> through TDATA<2> are 011, and/or the NMOS transistors 657 through 659 may activate the third down signal SWD2 to a logic high if the first through third transmission data TDATA<0> through TDATA<2> are 111. The third down signal SWD2 may be activated to a logic low for the remainder of the combinations of the first through third transmission data TDATA<0> through TDATA<2>.

Figure 6E:
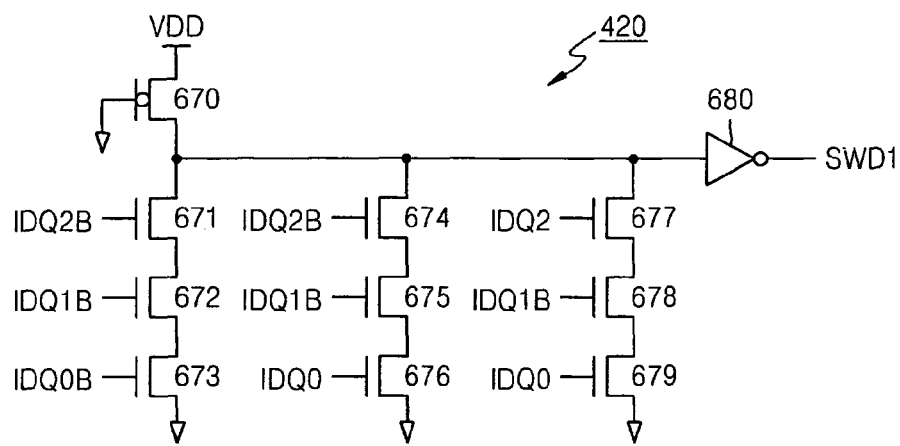

Referring to FIG. 6E, the encoding unit 420 may include a PMOS transistor 670. A source of the PMOS transistor 670 may be connected to the source voltage VDD, and/or a gate of the PMOS transistor 670 may be connected to the ground voltage VSS. A plurality of NMOS transistors 671 through 673 connected in series, a plurality of NMOS transistors 674 through 676 connected in series, and/or a plurality of NMOS transistors 677 through 679 connected in series may be included between a drain of the PMOS transistor 670 and the ground voltage VSS. The drain of the PMOS transistor 670 may be connected to an inverter 680, and/or the output of the inverter 680 may be generated as the second down signal SWD1. Gates of the NMOS transistors 671 through 673 may receive the sixth encoding signal IDQ2B, the fourth encoding signal IDQ1B, and the second encoding signal IDQ0B, respectively. Gates of the NMOS transistors 674 through 676 may receive the sixth encoding signal IDQ2B, the fourth encoding signal IDQ1B, and the first encoding signal IDQ0, respectively. Gates of the NMOS transistors 677 through 679 may receive the fifth encoding signal IDQ2, the fourth encoding signal IDQ1B, and the first encoding signal IDQ0, respectively. The NMOS transistors 671 through 673 may activate the second down signal SWD1 to a logic high if the first through third transmission data TDATA<0> through TDATA<2> are 000, the NMOS transistors 674 through 676 may activate the second down signal SWD1 to a logic high if the first through third transmission data TDATA<0> through TDATA<2> are 001, and/or the NMOS transistors 677 through 679 may activate the second down signal SWD1 to a logic high if the first through third transmission data TDATA<0> through TDATA<2> are 101. The second down signal SWD1 may be activated to a logic low for the remainder of the combinations of the first through third transmission data TDATA<0> through TDATA<2>.

Figure 6F:
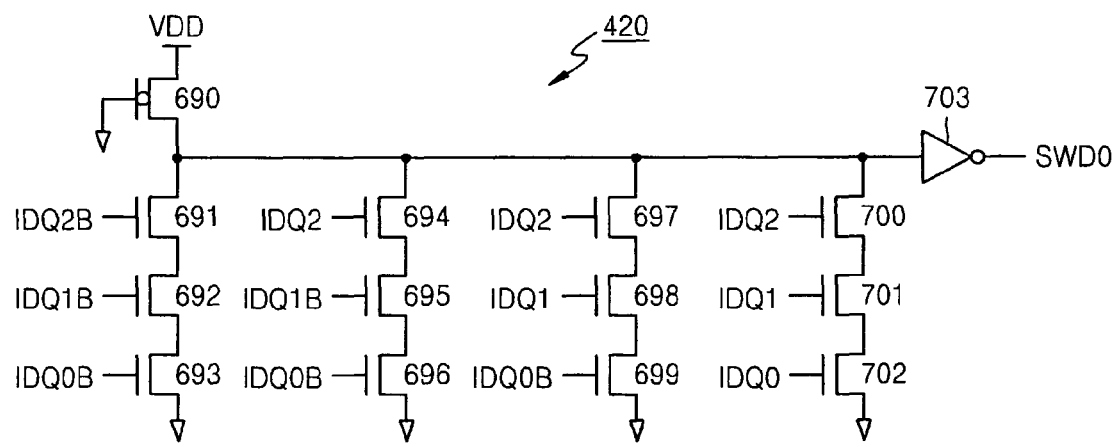

Referring to FIG. 6F, the encoding unit 420 may include a PMOS transistor 690. A source of the PMOS transistor 690 may be connected to the source voltage VDD, and/or a gate of the PMOS transistor 690 may be connected to the ground voltage VSS. A plurality of NMOS transistors 691 through 693 connected in series, a plurality of NMOS transistors 694 through 696 connected in series, a plurality of NMOS transistors 697 through 699 connected in series, and/or a plurality of NMOS transistors 700 through 702 connected in series may be included between a drain of the PMOS transistor 690 and the ground voltage VSS. The drain of the PMOS transistor 690 may be connected to an inverter 703, and/or the output of the inverter 703 may be generated as the first down signal SWD0. Gates of the NMOS transistors 691 through 693 may receive the sixth encoding signal IDQ2B, the fourth encoding signal IDQ1B, and the second encoding signal IDQ0B, respectively. Gates of the NMOS transistors 694 through 696 may receive the fifth encoding signal IDQ2, the fourth encoding signal IDQ1B, and the second encoding signal IDQ0B, respectively. Gates of the NMOS transistors 697 through 699 may receive the fifth encoding signal IDQ2, the third encoding signal IDQ1, and the second encoding signal IDQ0B, respectively. Gates of the NMOS transistors 700 through 702 may receive the fifth encoding signal IDQ2, the third encoding signal IDQ1, and the first encoding signal IDQ0, respectively. The NMOS transistors 691 through 693 may activate the first down signal SWD0 to a logic high if the first through third transmission data TDATA<0> through TDATA<2> are 000, the NMOS transistors 694 through 696 may activate the first down signal SWD0 to a logic high if the first through third transmission data TDATA<0> through TDATA<2> are 100, the NMOS transistors 697 through 699 may activate the first down signal SWD0 to a logic high if the first through third transmission data TDATA<0> through TDATA<2> are 110, and/or the NMOS transistors 700 through 702 may activate the first down signal SWD0 to a logic high if the first through third transmission data TDATA<0> through TDATA<2> are 111. The first down signal SWD0 may be activated to a logic low for the remainder of the combinations of the first through third transmission data TDATA<0> through TDATA<2>.

Output signals, e.g., the up signals SWU0 through SWU2 and the down signals SWD0 through SWD2 of the encoder 210, with respect to the first through third transmission data TDATA<0> through TDATA<2> are as shown Table 1 below.

TABLE 1

| TDATA<2> | TDATA<1> | TDATA<0> | SWU2 | SWU1 | SWU0 | SWD2 | SWD1 | SWD0 |
|---|---|---|---|---|---|---|---|---|
| 0 | 0 | 0 | 0 | 1 | 1 | 0 | 1 | 1 |
| 0 | 0 | 1 | 1 | 1 | 0 | 0 | 1 | 0 |
| 0 | 1 | 0 | 1 | 0 | 1 | 1 | 0 | 0 |
| 0 | 1 | 1 | 1 | 1 | 0 | 1 | 0 | 0 |
| 1 | 0 | 0 | 0 | 1 | 1 | 0 | 0 | 1 |
| 1 | 0 | 1 | 0 | 1 | 1 | 0 | 1 | 0 |
| 1 | 1 | 0 | 1 | 0 | 1 | 0 | 0 | 1 |
| 1 | 1 | 1 | 1 | 0 | 1 | 1 | 0 | 1 |

Figure 7:
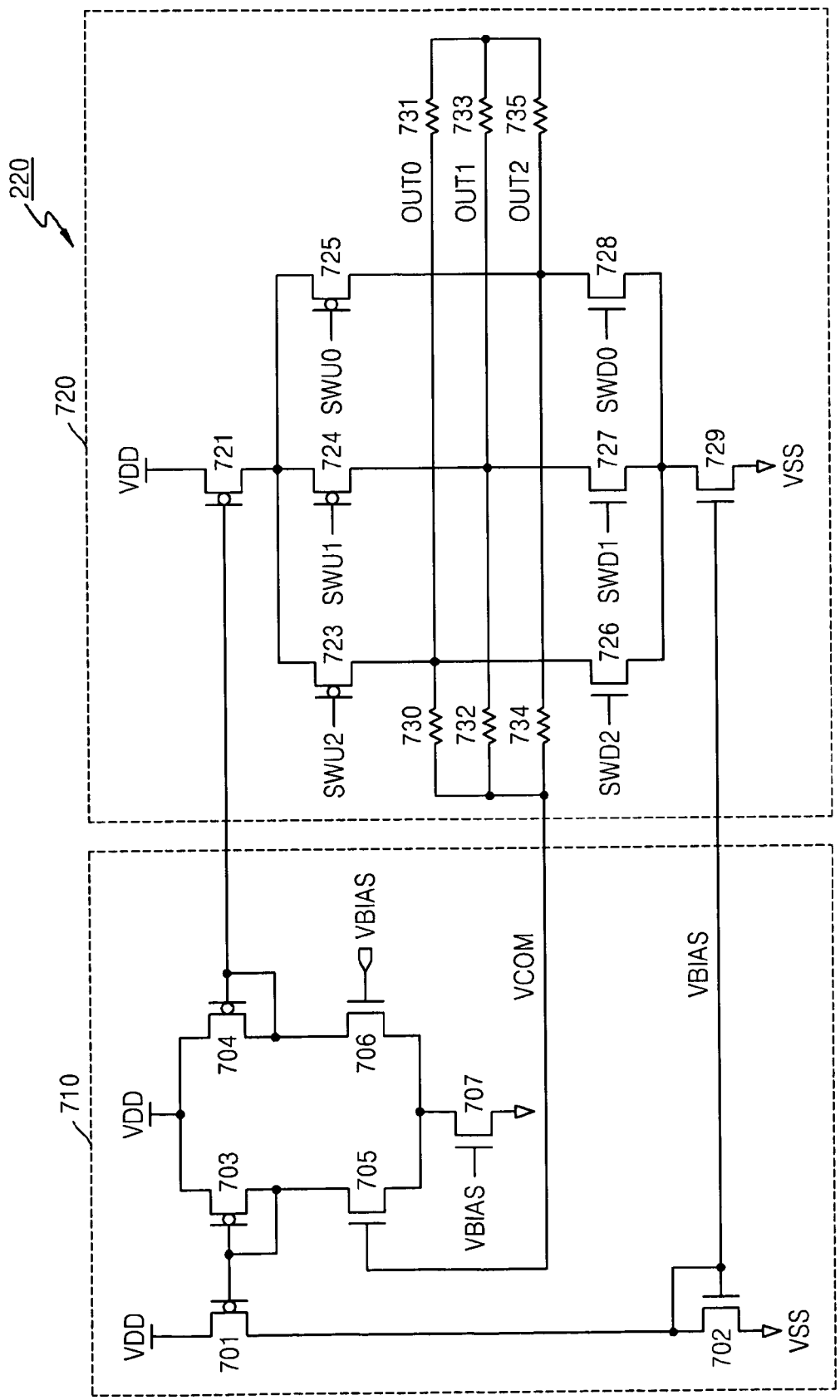
FIG. 7 is a circuit diagram of an output driver illustrated in FIG. 3, according to an example embodiment.

FIG. 7 is a circuit diagram of the output driver 220 illustrated in FIG. 3, according to an example embodiment.

Referring to FIG. 7, the output driver 220 may include a bias unit 710 and/or a switch unit 720. The bias unit 710 may include a PMOS transistor 701 and an NMOS transistor 702 connected in series between the source voltage VDD and the ground voltage VSS. A gate and drain of the NMOS transistor 702 may be connected to generate a bias signal VBIAS. The gate of the PMOS transistor 701 may be connected to a gate and drain of a PMOS transistor 703. Sources of the PMOS transistor 703 and a PMOS transistor 704 may be connected to the source voltage VDD. A gate of an NMOS transistor 705 may be connected to a common voltage VCOM and/or a drain of the NMOS transistor 705 may be connected to the drain of the PMOS transistor 703. A gate of an NMOS transistor 706 may be connected to a reference voltage VREF and/or a drain of the NMOS transistor 706 may be connected to a gate and drain of the PMOS transistor 704. A gate of an NMOS transistor 707 may be connected to the bias signal VBIAS, a drain of the NMOS transistor 707 may be connected to sources of the NMOS transistors 705 and 706, and/or a source of the NMOS transistor 707 may be connected to the ground voltage VSS.

The switch unit 720 may include a PMOS transistor 721. A source of the PMOS transistor 721 may be connected to the source voltage VDD, and/or a gate of the PMOS transistor 721 may be connected to the gate of the PMOS transistor 704. A gate of an NMOS transistor 729 may be connected to the bias signal VBIAS, and/or a source of the NMOS transistor 729 may be connected to the ground voltage VSS. The switch unit 720 may include a PMOS transistor 723 and an NMOS transistor 726 connected in series, a PMOS transistor 724 and an NMOS transistor 727 connected in series, and/or a PMOS transistor 725 and an NMOS transistor 728 connected in series between the PMOS transistor 721 and the NMOS transistor 729.

The gate of the PMOS transistor 723 may be connected to the third up signal SWU2, the gate of the PMOS transistor 724 may be connected to the second up signal SWU1, and/or the gate of the PMOS transistor 725 may be connected to the first up signal SWU0. The gate of the NMOS transistor 726 may be connected to the third down signal SWD2, the gate of the NMOS transistor 727 may be connected to the second down signal SWD1, and/or the gate of the NMOS transistor 728 may be connected to the first down signal SWD0. The PMOS and NMOS transistors 723 through 728, which are turned on by the up signals SWU0 through SWU2 and the down signals SWD0 through SWD2, may function as a plurality of switches. The first data OUT0 may be output through a node connected between the PMOS transistor 723 and the NMOS transistor 726, the second data OUT1 may be output through a node connected between the PMOS transistor 724 and the NMOS transistor 727, and/or the third data OUT2 may be output through a node connected between the PMOS transistor 725 and the NMOS transistor 728.

The switch unit 720 may include a plurality of resistors 730 and 731, first ends of which are connected to the node connected between the PMOS transistor 723 and the NMOS transistor 726, a plurality of resistors 732 and 733, first ends of which are connected to the node connected between the PMOS transistor 724 and the NMOS transistor 727, and/or a plurality of resistors 734 and 735, first ends of which are connected to the node connected between the PMOS transistor 725 and the NMOS transistor 728. Second ends of the resistors 731, 733 and 735 may be connected to each other and/or second ends of the resistors 730, 732, and 734 may be connected to each other to generate the common voltage VCOM.

The switch unit 720 may generate the first through third data OUT0 through OUT2 by electric current paths formed by the PMOS and NMOS transistors 723 through 728, which are selectively turned on by the up signals SWU0 through SWU2 and the down signals SWD0 through SWD2, and/or the resistors 730 through 735 as shown in Table 2 below.

level ML may be higher than the voltage level L. However, example embodiments are not limited thereto, and the voltage levels of the first through third data OUT0 through OUT2 may be indicated using more than 4 voltage levels.

Referring back to FIG. 3, the signal reception unit 300 may receive the first through third data OUT0 through OUT2 through the three transmission lines 110, 120 and 130 and/or restore the first through third data OUT0 through OUT2 into the first through third reception data RDATA<0> through RDATA <2>. The signal reception unit 300 may include a differential amplification unit 310, a middle level detection unit 320, a flip-flop unit 330, and/or a decoder 340.

The differential amplification unit 310 may sense-amplify voltage differences between two data from among the first through third data OUT0 through OUT2. A first differential amplifier 311 may sense-amplify the voltage difference between the first and second data OUT0 and OUT1, a second differential amplifier 312 may sense-amplify the voltage difference between the second and third data OUT1 and OUT2, and/or a third differential amplifier 313 may sense-amplify the voltage difference between the first and third data OUT2 and OUT0.

The middle level detection unit 320 may receive first, third, and fifth output signals Q0 through Q2 from among first through sixth output signals Q0, Q0B, Q1, Q1B, Q2, and Q2B of the differential amplification unit 310 and/or generate first through fourth level signals VN0, VN0B, VN2, and VN2B. A first middle level detector 321 may compare the level of the first output signal Q0 with the levels of the third and fifth output signals Q1 and Q2 and/or generate the first and second level signals VN0 and VN0B. A second middle level detector 322 may compare the level of the fifth output signal Q2 with the levels of the first and third output signals Q0 and Q1 and/or generate the third and fourth level signals VN2 and VN2B.

The flip-flop unit 330 may receive the first through sixth output signals Q0, Q0B, Q1, Q1B, Q2, and Q2B of the differential amplification unit 310 and/or the first through fourth level signals VN0, VN0B, VN2 and VN2B of the middle level detection unit 320. The flip-flop unit 330 may generate first through tenth sensing signals DQ0, DQ0B, DQ1, DQ1B, DQ2, DQ2B, DQM0, DQM0B, DQM2 and DQM2B. The decoder 340 may decode the sensing signals DQ0, DQ0B,

TABLE 2

| TDATA<2> | TDATA<1> | TDATA<0> | SWU2 | SWU1 | SWU0 | SWD2 | SWD1 | SWD0 | OUT0 | OUT1 | OUT2 |
|---|---|---|---|---|---|---|---|---|---|---|---|
| 0 | 0 | 0 | 0 | 1 | 1 | 0 | 1 | 1 | ML | ML | H |
| 0 | 0 | 1 | 1 | 1 | 0 | 0 | 1 | 0 | H | L | M |
| 0 | 1 | 0 | 1 | 0 | 1 | 1 | 0 | 0 | M | H | L |
| 0 | 1 | 1 | 1 | 1 | 0 | 1 | 0 | 0 | H | M | L |
| 1 | 0 | 0 | 0 | 1 | 1 | 0 | 0 | 1 | L | M | H |
| 1 | 0 | 1 | 0 | 1 | 1 | 0 | 1 | 0 | M | L | H |
| 1 | 1 | 0 | 1 | 0 | 1 | 0 | 0 | 1 | L | H | M |
| 1 | 1 | 1 | 1 | 0 | 1 | 1 | 0 | 1 | ML | H | ML |

The voltage levels of the first through third data OUT0 through OUT2 are indicated using H, M, ML, and L in accordance with the number of the PMOS and NMOS transistors 723 through 728 which are turned on by the up signals SWU0 through SWU2 and the down signals SWD0 through SWD2. For example, if the patterns of the first through third transmission data TDATA<0> through TDATA<2> are 000 or 111, two of the NMOS transistors 726 through 728 are turned on and thus a voltage level ML is generated. The voltage level H may be higher than the voltage level M, the voltage level M may be higher than the voltage level ML, and/or the voltage DQ1, DQ1B, DQ2, DQ2B, DQM0, DQM0B, DQM2, and DQM2B and/or output the first through third reception data RDATA<0> through RDATA <2>.

Figure 8:
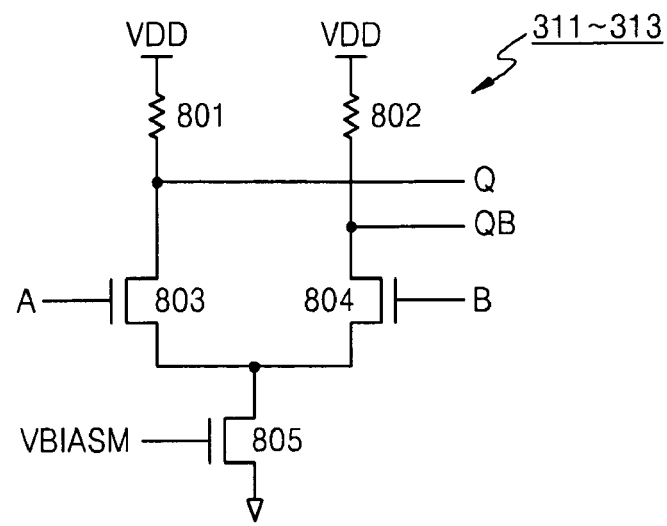
FIG. 8 is a circuit diagram of any one of first through third differential amplifiers illustrated in FIG. 3, according to an example embodiment.

FIG. 8 is a circuit diagram of any one of the first through third differential amplifiers 311 through 313 illustrated in FIG. 3, according to an example embodiment.

Referring to FIG. 8, each of the first through third differential amplifiers 311 through 313 may include first and second resistors 801 and 802 and first through third NMOS transistors 803 through 805. The first resistor 801 may be connected between the source voltage VDD and the first NMOS transistor 803 and/or the second resistor 802 may be connected between the source voltage VDD and the second NMOS transistor 804. A gate of the first NMOS transistor 803 may be connected to a first input signal A, and/or a gate of the second NMOS transistor 804 may be connected to a second input signal B. A gate of the third NMOS transistor 805 may be connected to a bias signal VBIASM, a drain of the third NMOS transistor 805 may be connected to sources of the first and second NMOS transistors 803 and 804, and/or a source of the third NMOS transistor 805 may be connected to the ground voltage VSS. A drain of the first NMOS transistor 803 may output a first output signal Q, and/or a drain of the second NMOS transistor 804 may output a second output signal QB.

Figure 9:
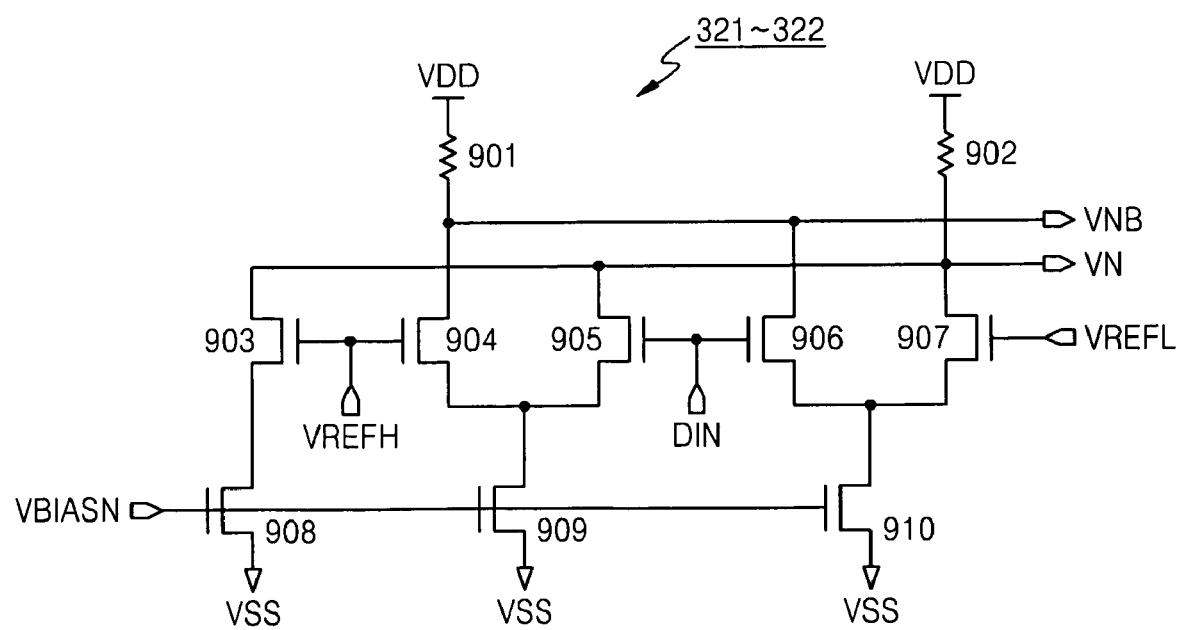
FIG. 9 is a circuit diagram of any one of first and second middle level detectors illustrated in FIG. 3, according to an example embodiment.

FIG. 9 is a circuit diagram of any one of the first and second middle level detectors 321 and 322 illustrated in FIG. 3, according to an example embodiment.

Referring to FIG. 9, each of the first and second middle level detectors 321 and 322 may include first and second resistors 901 and 902 connected to the source voltage VDD. Gates of first and second NMOS transistors 903 and 904 may be connected to a first reference signal VREFH. Gates of third and fourth NMOS transistors 905 and 906 may be connected to an input signal DIN. A gate of a fifth NMOS transistor 907 may be connected to a second reference signal VREFL. Gates of sixth through eighth NMOS transistors 908 through 910 may be connected to a bias voltage VBIASN and/or sources of the sixth through eighth NMOS transistors 908 through 910 may be connected to the ground voltage VSS. Drains of the second and fourth NMOS transistors 904 and 906, which are connected to the first resistor 901, may output a second level signal VNB. Drains of the first, third and fifth NMOS transistors 903, 905, and 907, which are connected to the second resistor 902, may output a first level signal VN. A source of the first NMOS transistor 903 may be connected to a drain of the sixth NMOS transistor 908, sources of the second and third NMOS transistors 904 and 905 may be connected to a drain of the seventh NMOS transistor 909, and/or sources of the fourth and fifth NMOS transistors 906 and 907 may be connected to the drain of the eighth NMOS transistor 910.

Figure 10:
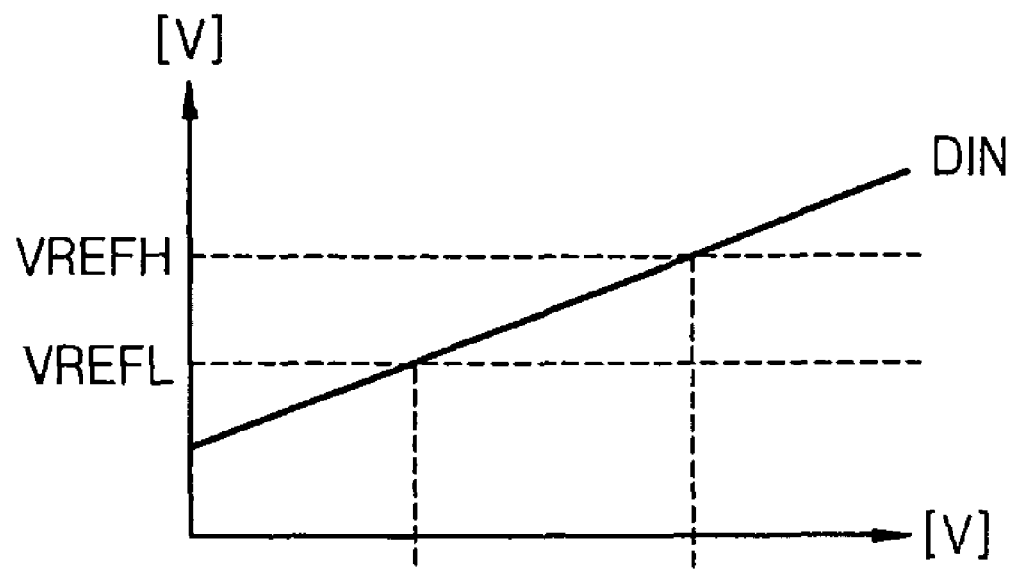
FIG. 10 is example graphs illustrating an example operation of any one of first and second middle level detectors illustrated in FIGS. 3 and 9, according to an example embodiment.
Figure 10:
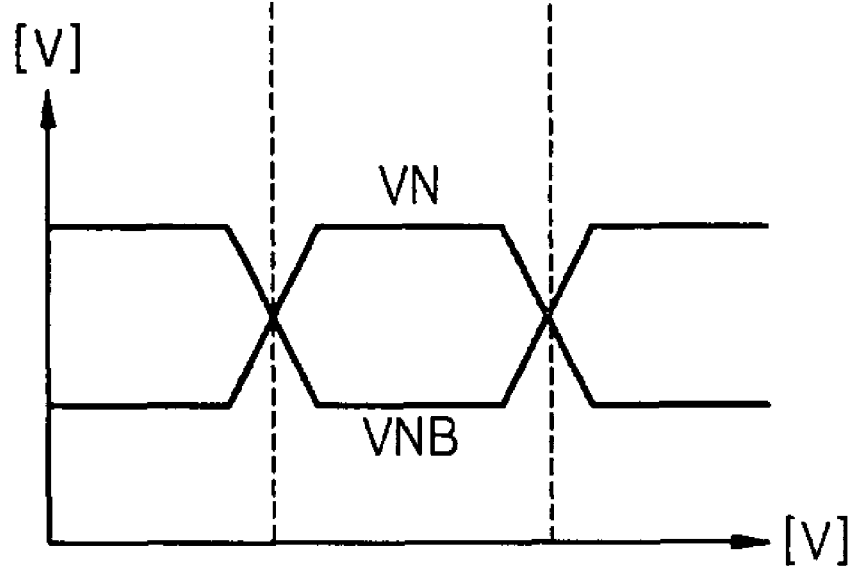

FIG. 10 shows example graphs for illustrating an operation of any one of the first and second middle level detectors 321 and 322 illustrated in FIGS. 3 and 9, according to an example embodiment.

Referring to FIG. 10, if the level of the input signal DIN is between the levels of the first and second reference signals VREFH and VREFL, the first level signal VN may be generated at a logic high level and/or the second level signal VNB may be generated at a logic low level. If the level of the input signal DIN is equal to or higher than the level of the first reference signal VREFH or is equal to or lower than the level of the second reference signal and VREFL, the first level signal VN may be generated at a logic low level and/or the second level signal VNB may be generated at a logic high level.

The output signals Q0, Q1, Q2, VN0, and VN2 in accordance with operations of the differential amplification unit 310 and the middle level detection unit 320 illustrated in FIG. 3, which receive the first through third data OUT0 through OUT2, are shown in Table 3 below.

TABLE 3

| TDATA<2> | TDATA<1> | TDATA<0> | OUT0 | OUT1 | OUT2 | Q0 | Q1 | Q2 | VN0 | VN2 |
|---|---|---|---|---|---|---|---|---|---|---|
| 0 | 0 | 0 | ML | ML | H | X | L | H | H | L |
| 0 | 0 | 1 | H | L | M | H | L | L | L | L |
| 0 | 1 | 0 | M | H | L | L | H | L | L | L |
| 0 | 1 | 1 | H | M | L | H | H | L | L | L |
| 1 | 0 | 0 | L | M | H | L | L | H | L | L |
| 1 | 0 | 1 | M | L | H | H | L | H | L | L |
| 1 | 1 | 0 | L | H | M | L | H | H | L | L |
| 1 | 1 | 1 | ML | H | ML | L | H | X | L | H |

Figure 11:
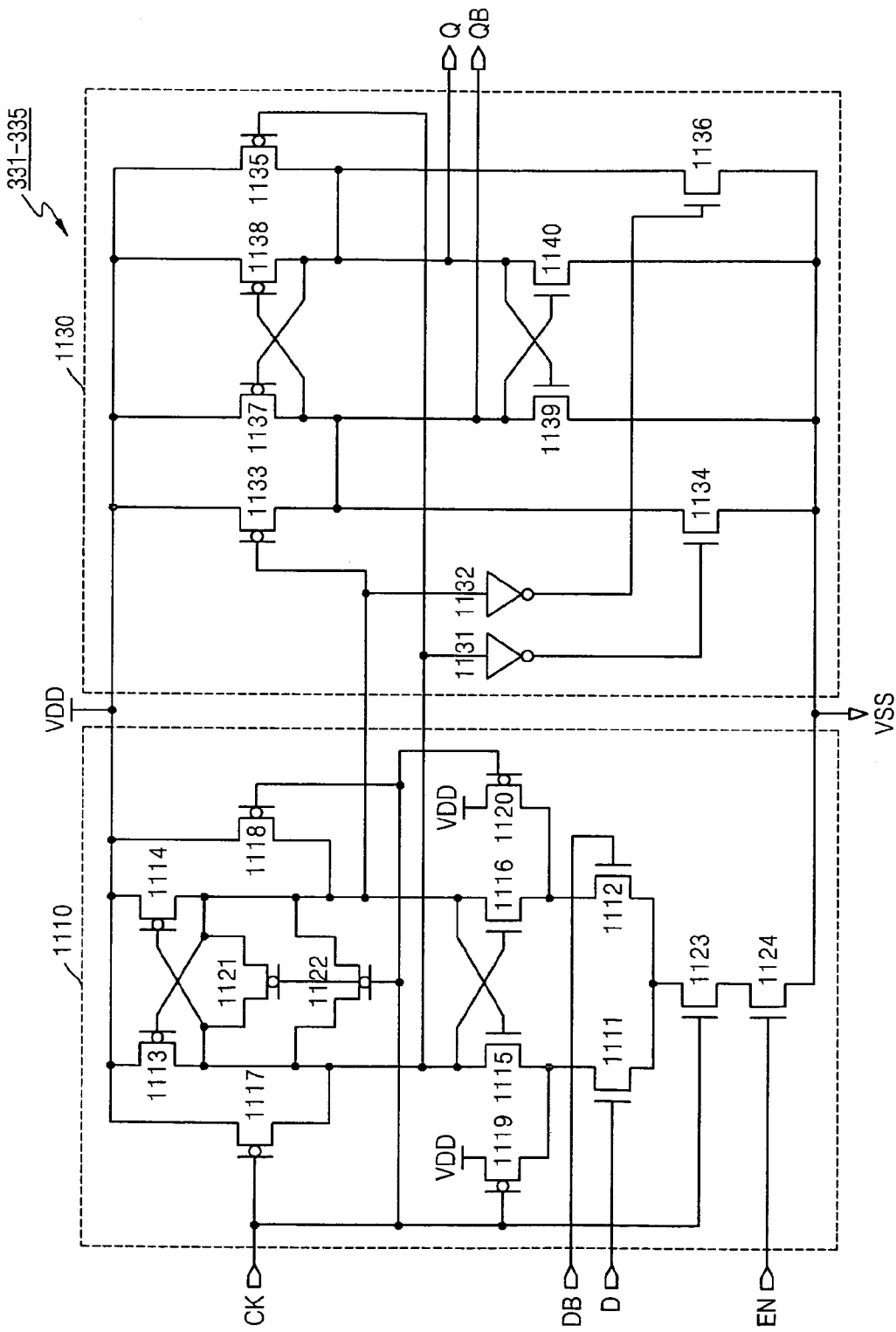
FIG. 11 is a circuit diagram of any one of first through fifth flip-flops illustrated in FIG. 3, according to an example embodiment.

FIG. 11 is a circuit diagram of any one of first through fifth flip-flops 331 through 335 illustrated in FIG. 3, according to an example embodiment.

Referring to FIG. 11, each of the flip-flops 331 through 335 may include a sensing unit 1110 and/or a latch unit 1130. The sensing unit 1110 may include an NMOS transistor 1111 and/or an NMOS transistor 1112. A gate of the NMOS transistor 1111 may be connected to a first input signal D. A gate of the NMOS transistor 1112 may be connected to a second input signal DB. Each of the flip-flops 331 through 335 illustrated in FIG. 3 may be connected to the source voltage VDD and/or include a plurality of PMOS transistors 1113 and 1114, the gates and drains of the plurality of PMOS transistors 1113 and 1114 may be connected to cross each other. An NMOS transistor 1115 may be connected between the PMOS transistor 1113 and the NMOS transistor 1111 and/or an NMOS transistor 1116 may be connected between the PMOS transistor 1114 and the NMOS transistor 1112.

Gates of a plurality of PMOS transistors 1117 and 1118 may be connected to a clock signal CK. The PMOS transistor 1117 may be connected between the source voltage VDD and a node connected between the PMOS transistor 1113 and the NMOS transistor 1115. The PMOS transistor 1118 may be connected between the source voltage VDD and a node connected between the PMOS transistor 1114 and the NMOS transistor 1116. Gates of a plurality of PMOS transistors 1119 and 1120 may be connected to the clock signal CK. The PMOS transistor 1119 may be connected between the source voltage VDD and a node connected between the NMOS transistors 1111 and 1115. The PMOS transistor 1120 may be connected between the source voltage VDD and a node connected between the NMOS transistors 1112 and 1116.

Gates of a plurality of PMOS transistors 1121 and 1122 may be connected to the clock signal CK. The plurality of PMOS transistors 1121 and 1122 may be connected between the drains of the PMOS transistors 1113 and 1114. A gate of an NMOS transistor 1123 may be connected to the clock signal CK and/or a drain of the NMOS transistor 1123 may be connected to sources of the NMOS transistors 1111 and 1112. A gate of an NMOS transistor 1124 may be connected to an enable signal EN, a drain of the NMOS transistor 1124 may be connected to a source of the NMOS transistor 1123, and/or a source of the NMOS transistor 1124 may be connected to the ground voltage VSS.

The latch unit 1130 may include an inverter 1131 connected to a drain of the NMOS transistor 1115 and/or an inverter 1132 connected to a drain of the NMOS transistor 1116. A gate of a PMOS transistor 1133 may be connected to a drain of the NMOS transistor 1116, and/or a gate of an NMOS transistor 1134 may be connected to the output of the inverter 1131. The PMOS transistor 1133 and the NMOS The first, third, fifth, seventh, and ninth sensing signals DQ0, DQ1, DQ2, DQM0 and DQM2 in accordance with operation of the flip-flop unit 330, which receives the first, third and fifth output signals Q0 through Q2 of the differential amplification unit 310 and the first and third level signals VN0 and VN2 output from the middle level detection unit 320, are shown in Table 4 below.

TABLE 4

| TDATA<2> | TDATA<1> | TDATA<0> | Q0 | Q1 | Q2 | VN0 | VN2 | DQ0 | DQ1 | DQ2 | DQM0 | DQM2 |
|---|---|---|---|---|---|---|---|---|---|---|---|---|
| 0 | 0 | 0 | X | L | H | H | L | H | L | H | H | L |
| 0 | 0 | 1 | H | L | L | L | L | H | L | L | L | L |
| 0 | 1 | 0 | L | H | L | L | L | L | H | L | L | L |
| 0 | 1 | 1 | H | H | L | L | L | H | H | L | L | L |
| 1 | 0 | 0 | L | L | H | L | L | L | L | H | L | L |
| 1 | 0 | 1 | H | L | H | L | L | H | L | H | L | L |
| 1 | 1 | 0 | L | H | H | L | L | L | H | H | L | L |
| 1 | 1 | 1 | L | H | X | L | H | L | H | H | L | H | transistor 1134 may be connected in series between the source and ground voltages VDD and VSS. A gate of a PMOS transistor 1135 may be connected to the drain of the NMOS transistor 1115, and/or a gate of an NMOS transistor 1136 may be connected to the output of the inverter 1132. The PMOS transistor 1135 and the NMOS transistor 1136 may be connected in series between the source and ground voltages VDD and VSS.

The latch unit 1130 may include a plurality of PMOS transistors 1137 and 1138. Sources of the plurality of PMOS transistors 1137 and 1138 may be connected to the source voltage VDD, and/or gates and drains of the plurality of PMOS transistors 1137 and 1138 may be connected to cross each other. The drains of the PMOS transistors 1137 and 1138 may be respectively connected to the drains of a plurality of NMOS transistors 1139 and 1140. The gates and drains of the NMOS transistors 1139 and 1140 may be connected to cross each other and/or sources of the NMOS transistors 1139 and 1140 may be connected to the ground voltage VSS. A node connected between the PMOS transistor 1138 and the NMOS transistor 1140 may output the first output signal Q and a node connected between the PMOS transistor 1137 and the NMOS transistor 1139 may output the second output signal QB.

Referring back to FIG. 3, the first flip-flop 331 may receive the first output signal Q0 of the differential amplification unit 310 as the first input signal D, receive the second output signal Q0B of the differential amplification unit 310 as the second input signal DB, and/or generate the first and second sensing signals DQ0 and DQ0B from the first and second output signals Q0 and Q0B. The second flip-flop 332 may receive the third and fourth output signals Q1 and Q1B of the differential amplification unit 310 and/or generate the third and fourth sensing signals DQ1 and DQ1B. The third flip-flop 333 may receive the fifth and sixth output signals Q2 and Q2B of the differential amplification unit 310 and/or generate the fifth and sixth sensing signals DQ2 and DQ2B. The fourth flip-flop 334 may receive the first and second level signals VN0 and VN0B output from the middle level detection unit 320 and/or generate the seventh and eighth sensing signals DQM0 and DQM0B. The fifth flip-flop 335 may receive the third and fourth level signals VN2 and VN2B output from the middle level detection unit 320 and/or generate the ninth and tenth sensing signals DQM2 and DQM2B.

Figure 12:
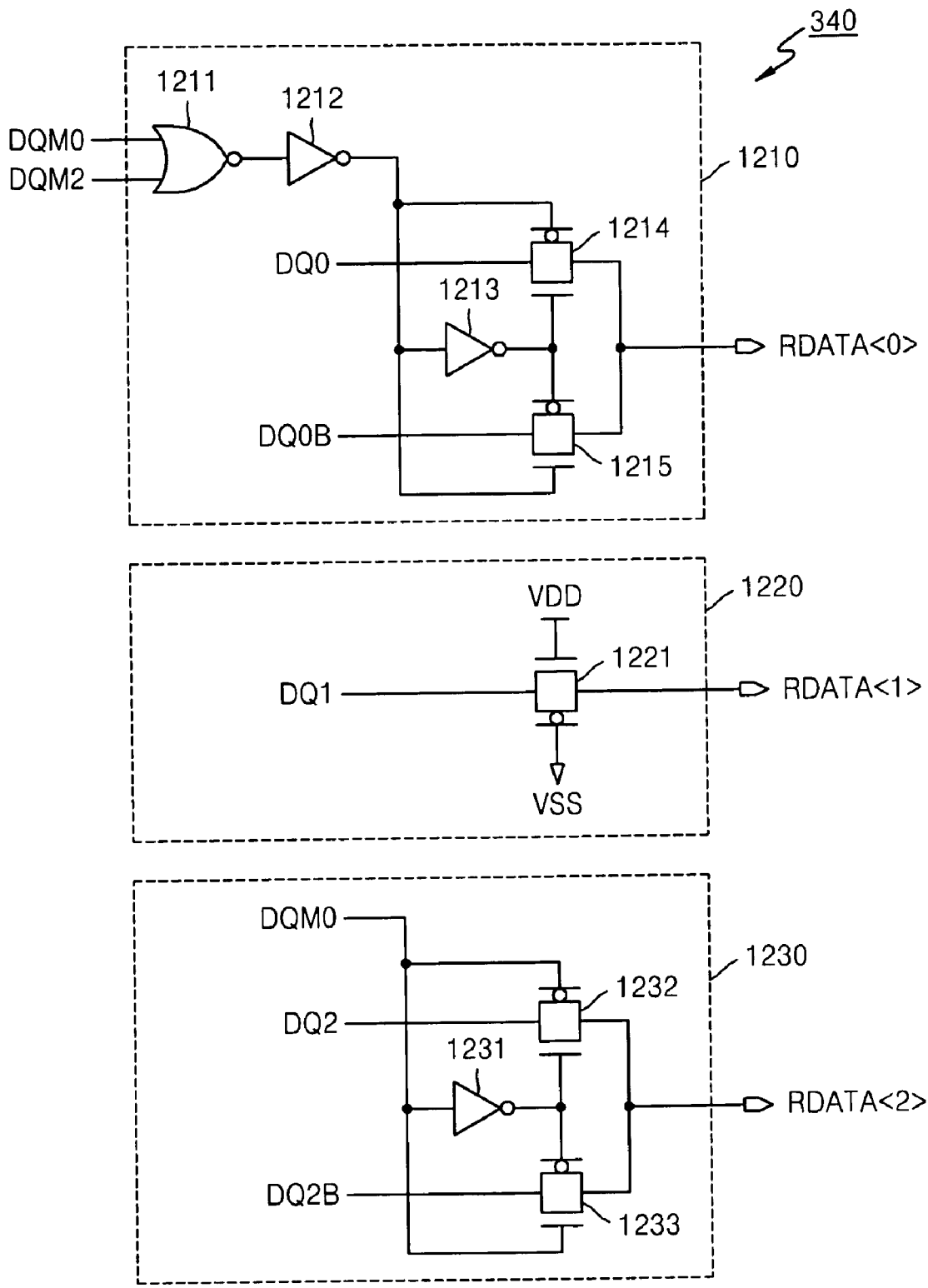
FIG. 12 is a circuit diagram of a decoder illustrated in FIG. 3, according to an example embodiment.

FIG. 12 is a circuit diagram of the decoder 340 illustrated in FIG. 3, according to an example embodiment.

Referring to FIG. 12, the decoder 340 may include first through third reception data generation units 1210, 1220, and 1230. The first reception data generation unit 1210 may include a NOR gate 1211 configured to receive the seventh and ninth sensing signals DQM0 and DQM2, a first inverter 1212 configured to receive the output of the NOR gate 1211, a second inverter 1213 configured to receive the output of the first inverter 1212, a first transmission gate 1214 configured to output the first sensing signal DQ0 as the first reception data RDATA<0> in response to the outputs of the first and second inverters 1212 and 1213, and/or a second transmission gate 1215 configured to output the second sensing signal DQ0B as the first reception data RDATA<0> in response to the outputs of the first and second inverters 1212 and 1213.

The second reception data generation unit 1220 may include a transmission gate 1221 configured to output the third sensing signal DQ1 as the second reception data RDATA<1> in response to the source and ground voltages VDD and VSS.

The third reception data generation unit 1230 may include an inverter 1231 configured to receive the seventh sensing signal DQM0, a first transmission gate 1232 configured to outputs the fifth sensing signal DQ2 as the third reception data RDATA<2> in response to the output of the inverter 1231, and/or a second transmission gate 1233 configured to output the sixth sensing signal DQ2B as the third reception data RDATA<2> in response to the outputs of the seventh sensing signal DQM0 and the inverter 1231.

The first through third reception data RDATA<0> through RDATA <2> in accordance with operation of the decoder 340, which receives the first, third, fifth, seventh, and ninth sensing signals DQ0, DQ1, DQ2, DQM0, and DQM2, are shown in Table 5 below.

TABLE 5

| TDATA<2> | TDATA<1> | TDATA<0> | DQ0 | DQ1 | DQ2 | DQM0 | DQM2 | RDATA<2> | RDATA<1> | RDATA<0> |
|---|---|---|---|---|---|---|---|---|---|---|
| 0 | 0 | 0 | H | L | H | H | L | 0 | 0 | 0 |
| 0 | 0 | 1 | H | L | L | L | L | 0 | 0 | 1 |
| 0 | 1 | 0 | L | H | L | L | L | 0 | 1 | 0 |
| 0 | 1 | 1 | H | H | L | L | L | 0 | 1 | 1 |
| 1 | 0 | 0 | L | L | H | L | L | 1 | 0 | 0 |
| 1 | 0 | 1 | H | L | H | L | L | 1 | 0 | 1 |
| 1 | 1 | 0 | L | H | H | L | L | 1 | 1 | 0 |
| 1 | 1 | 1 | L | H | H | L | H | 1 | 1 | 1 |

Figure 13:
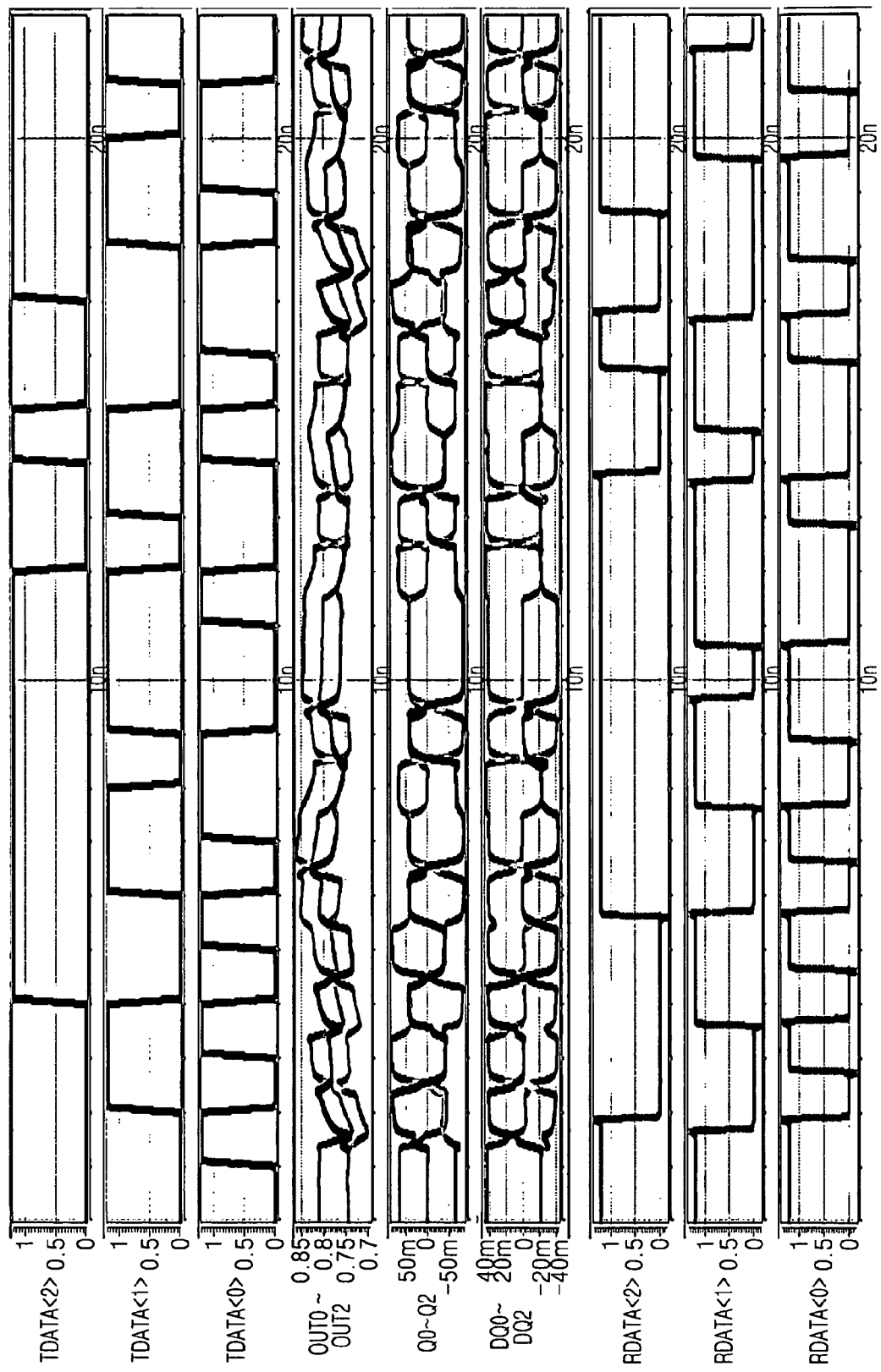
FIG. 13 is an example diagram illustrating an example simulation result of the signal transceiver illustrated in FIG. 3, according to an example embodiment.

FIG. 13 is a diagram illustrating an example simulation result of the signal transceiver 100 illustrated in FIG. 3, according to an example embodiment.

The first through third transmission data TDATA<0> through TDATA<2> transmitted through the three transmission lines 110, 120, and 130 may be restored into the first through third reception data RDATA<0> through RDATA<2> with fewer or no errors, as shown in FIG. 13.

As described above, according to example embodiments, random data communication of 3-bit data having eight patterns may be enabled in a differential mode using three transmission lines.

Although example embodiments have been shown and described in this specification and figures, it would be appreciated by those skilled in the art that changes may be made to the illustrated and/or described example embodiments without departing from their principles and spirit.

What is claimed is:

1. A signal transceiver comprising:
   three transmission lines;
   a signal transmission unit configured to encode first through third transmission data to generate first through third data and transmit the first through third data through the three transmission lines, the signal transmission unit configured to generate each of the first through third data at one of four or more voltage levels; and
   a signal reception unit configured to receive the first through third data and monitor voltage differences between the first through third data to restore the first through third data into first through third reception data.

2. The signal transceiver of claim 1, wherein the voltage levels of the first through third data are based on electric current paths respectively formed on the three transmission lines.

3. The signal transceiver of claim 1, wherein the signal transmission unit comprises:
   an encoder configured to encode the first through third transmission data to generate first through third up signals and first through third down signals; and
   an output driver configured to determine the voltage levels of the first through third data based on a number of switches turned on in response to the first through third up signals and the first through third down signals.

4. The signal transceiver of claim 3, wherein the encoder comprises:
   a buffer unit configured to receive the first through third transmission data and generate first through sixth encoding signals; and
   an encoding unit configured to receive the first through sixth encoding signals and generate the first through third up signals and the first through third down signals.

5. The signal transceiver of claim 4, wherein the output driver comprises:
   a bias unit configured to compare a reference voltage and a common voltage and generate first and second bias signals; and
   a switch unit including the switches, the switches configured to be enabled in response to the first and second bias signals and turned on in response to the first through third up signals and the first through third down signals.

6. The signal transceiver of claim 1, wherein the signal reception unit comprises:
   a differential amplification unit configured to sense-amplify the voltage differences between two data from among the first through third data transferred through the three transmission lines;
   a middle level detection unit configured to receive a plurality of output signals of the differential amplification unit and generate a plurality of level signals;
   a flip-flop unit configured to sense each of the output signals of the differential amplification unit and each of the level signals of the middle level detection unit and generate a plurality of sensing signals; and
   a decoder configured to decode a plurality of output signals of the flip-flop unit to output the first through third reception data.

7. The signal transceiver of claim 6, wherein the differential amplification unit comprises:
   a first differential amplifier configured to sense-amplify the voltage difference between the first and second data;
   a second differential amplifier configured to sense-amplify the voltage difference between the second and third data; and
   a third differential amplifier configured to sense-amplify the voltage difference between the first and third data.

8. The signal transceiver of claim 7, wherein the middle level detection unit comprises:
   a first middle level detector configured to compare a level of an output signal of the first differential amplifier with levels of output signals of the second and third differential amplifiers and generate a first level signal; and
   a second middle level detector configured to compare the level of the output signal of the third differential amplifier with the levels of the output signals of the first and second differential amplifiers and generate a second level signal.

9. The signal transceiver of claim 8, wherein the flip-flop unit comprises:
   a first flip-flop configured to sense the output signal of the first differential amplifier and generate first and second sensing signals;
   a second flip-flop configured to sense the output signal of the second differential amplifier and generate third and fourth sensing signals;
   a third flip-flop configured to sense the output signal of the third differential amplifier and generate fifth and sixth sensing signals;

a fourth flip-flop configured to sense the first level signal of the first middle level detector and generate seventh and eighth sensing signals; and a fifth flip-flop configured to sense the second level signal of the second middle level detector and generate ninth and tenth sensing signals.

10. The signal transceiver of claim 9, wherein the decoder comprises:

a first reception data generation unit configured to output at least one of the first sensing signal and the second sensing signal as the first reception data in response to the seventh and ninth sensing signals;

a second reception data generation unit configured to output the third sensing signal as the second reception data; and a third reception data generation unit configured to output at least one of the fifth sensing signal and the sixth sensing signal as the third reception data in response to the seventh sensing signal.

11. The signal transceiver of claim 1, wherein the signal transmission unit comprises:

an encoder configured to encode the first through third transmission data to generate first through third up signals and first through third down signals; and an output driver configured to determine the voltage levels of first through third data based on a number of switches turned on in response to the first through third up signals and the first through third down signals; and wherein the three transmission lines include first through third transmission lines configured to respectively transmit the first through third data; and wherein the signal reception unit comprises:

a differential amplification unit configured to sense-amplify the voltage differences between two data from among the first through third data transferred through the first through third transmission lines;

a middle level detection unit configured to receive a plurality of output signals of the differential amplification unit and generate a plurality of level signals;

a flip-flop unit configured to sense each of the output signals of the differential amplification unit and each of the level signals of the middle level detection unit and generate a plurality of sensing signals; and a decoder configured to decode a plurality of output signals of the flip-flop unit to output the first through third reception data.

12. The signal transceiver of claim 11, wherein the encoder comprises:

a buffer unit configured to which receive the first through third transmission data and generate first through sixth encoding signals; and an encoding unit configured to receive the first through sixth encoding signals and generate the first through third up signals and the first through third down signals.

13. The signal transceiver of claim 12, wherein the output driver comprises:

a bias unit configured to compare a reference voltage and a common voltage and generate first and second bias signals; and a switch unit including the switches, the switches configured to be enabled in response to the first and second bias signals and turned on in response to the first through third up signals and the first through third down signals.

14. The signal transceiver of claim 11, wherein the differential amplification unit comprises:

a first differential amplifier configured to sense-amplify the voltage difference between the first and second data;

a second differential amplifier configured to sense-amplify the voltage difference between the second and third data; and a third differential amplifier configured to sense-amplify the voltage difference between the first and third data.

15. The signal transceiver of claim 14, wherein the middle level detection unit comprises:

a first middle level detector configured to compare a level of an output signal of the first differential amplifier with levels of output signals of the second and third differential amplifiers and generate a first level signal; and a second middle level detector configured to compare the level of the output signal of the third differential amplifier with the levels of the output signals of the first and second differential amplifiers and generate a second level signal.

16. The signal transceiver of claim 15, wherein the flip-flop unit comprises:

a first flip-flop configured to sense the output signal of the first differential amplifier and generate first and second sensing signals;

a second flip-flop configured to sense the output signal of the second differential amplifier and generate third and fourth sensing signals;

a third flip-flop configured to sense the output signal of the third differential amplifier and generate fifth and sixth sensing signals;

a fourth flip-flop configured to sense the first level signal of the first middle level detector and generate seventh and eighth sensing signals; and a fifth flip-flop configured to sense the second level signal of the second middle level detector and generate ninth and tenth sensing signals.

17. The signal transceiver of claim 16, wherein the decoder comprises:

a first reception data generation unit configured to output at least one of the first sensing signal and the second sensing signal as the first reception data in response to the seventh and ninth sensing signals;

a second reception data generation unit configured to output the third sensing signal as the second reception data; and a third reception data generation unit configured to output at least one of the fifth sensing signal and the sixth sensing signal as the third reception data in response to the seventh sensing signal.

18. A method for data communication, comprising:

encoding first through third transmission data;

generating first through third data based on a number of switches turned on in response to the encoded first through third transmission data, each the first through third data generated at one of four or more voltage levels;

respectively transmitting the first through third data through first through third transmission lines;

receiving the first through third data;

sense-amplifying voltage differences between two data from among the first through third data to restore the first through third data into first through third reception data.

19. The method of claim 18, wherein the voltage levels of the first through third data are based on electric current paths respectively formed through the turned-on switches on the first through third transmission lines.

20. The method of claim 18, wherein the sense-amplifying the voltage differences between the two data from among the first through third data generates a plurality of differential output signals, and wherein the method further comprises:

comparing voltage levels of the differential output signals and generating a plurality of middle level signals;

sensing each of the differential output signals and each of the middle level signals to generate a plurality of sensing signals; and decoding the sensing signals to output the first through third reception data.

21. The method of claim 18, wherein
the encoding the first through third transmission data includes generating a plurality of up signals and a plurality of down signals,
the generating the first through third data includes respectively forming electric current paths on the first through third transmission lines through a plurality of switches turned on in response to the up and down signals, and wherein the method further comprises:

sensing voltage differences between the first through third data and monitoring voltage differences between the voltage levels of the first through third data to generate a plurality of sensing signals; and decoding the sensing signals to restore the first through third data into the first through third reception data.

* * * * *